(12) United States Patent
Longacre, Jr. et al.

(10) Patent No.: US 6,264,105 B1
(45) Date of Patent: Jul. 24, 2001

(54) BAR CODE READER CONFIGURED TO READ FINE PRINT BARCODE SYMBOLS

(75) Inventors: Andrew Longacre, Jr., Skaneateles; Robert M. Hussey, Camillus, both of NY (US)

(73) Assignee: Welch Allyn Data Collection, Inc., Skaneateles Falls, NY (US)

( * ) Notice: Subject to any disclaimer, the term of this patent is extended or adjusted under 35 U.S.C. 154(b) by 0 days.

(21) Appl. No.: 09/187,722

(22) Filed: Nov. 5, 1998

(51) Int. Cl.[7] .............................. G06K 9/18; G06K 7/10; G06K 9/80

(52) U.S. Cl. .................... 235/462.1; 235/462.11; 235/462.08

(58) Field of Search ............................ 235/462.1, 462.11, 235/462.12, 462.24, 462.25, 462.08, 462.09

(56) References Cited

U.S. PATENT DOCUMENTS

| | | |
|---|---|---|
| 4,978,860 | 12/1990 | Bayley et al. . |
| 5,120,940 * | 6/1992 | Willsie ................................ 235/462 |
| 5,134,272 * | 7/1992 | Tsuchiya et al. ................... 235/462 |
| 5,276,315 | 1/1994 | Surka . |
| 5,278,397 | 1/1994 | Barkan et al. . |
| 5,373,147 * | 12/1994 | Noda .................................. 235/462 |
| 5,378,881 * | 1/1995 | Adachi ............................... 235/462 |
| 5,396,054 * | 3/1995 | Krichever et al. ................. 235/462 |
| 5,489,769 * | 2/1996 | Kubo .................................. 235/462 |
| 5,504,319 * | 4/1996 | Li et al. ............................. 235/462 |
| 5,525,787 * | 6/1996 | Kubo .................................. 235/462 |
| 5,557,091 * | 9/1996 | Krummel ........................... 235/462 |
| 5,710,417 | 1/1998 | Joseph et al. . |
| 5,777,308 | 7/1998 | Shimizu et al. . |

\* cited by examiner

Primary Examiner—Karl D. Frech
(74) Attorney, Agent, or Firm—Wall Marjama & Bilinski

(57) ABSTRACT

In the present invention, a bar code reader captures an initial image map corresponding to a scene, then subjects the initial image map to an interpolation step wherein values for constructed pixels positionally intermediate pixel values of the initial image map are interpolated as a function of the initial image map pixel values bordering the constructed pixels. After an interpolated image map is constructed, the interpolated image map is subjected to a binarization step wherein grey scale pixel values of the interpolated image map are converted into binary (1 or 0) pixel values by way of a thresholding process. In the thresholding process, grey scale pixel values are compared to a threshold in the grey scale range, then set to 1 if they are above the threshold and set to 0 if below the threshold. The pixel values of the resulting binarized interpolated image map are then analyzed to determine the identity of a message which may be encoded in any symbol which may be represented in the binarized interpolated image map.

19 Claims, 5 Drawing Sheets

| 100 P1 | 110 P2 | 115 P3 | 125 P4 |
|---|---|---|---|
| 105 P5 | 120 P6 | 125 P7 | 135 P8 |
| 115 P9 | 120 P10 | 130 P11 | 135 P12 |
| 125 P13 | 125 P14 | 130 P15 | 135 P16 |

| 100 P1 | 105 P1-2 | 110 P2 | 112.5 P2-3 | 115 P3 | 120 P3-4 | 125 P4 |
|---|---|---|---|---|---|---|
| 102.5 P1-5 | 108.8 P1-2-5-6 | 115 P2-6 | 117.5 P2-3-6-7 | 120 P3-7 | 125 | 130 P4-8 |
| 105 P5 | 112.5 P5-6 | 120 P6 | 122.5 P6-7 | 125 P7 | 130 P7-8 | 135 P8 |
| 110 P5-9 | 115 P5-6-9-10 | 120 P6-10 | 123.8 P6-7-10-11 | 127.5 P7-11 | 131.3 P7-8-11-12 | 135 P8-12 |
| 115 P9 | 117.5 P9-10 | 120 P10 | 125 P10-11 | 130 P11 | 132.5 P11-12 | 135 P12 |
| 120 P9-13 | 121.3 P9-10-13-14 | 122.5 P10-14 | 126.3 P10-11-14-15 | 130 P11-13 | 132.5 P11-12-15-16 | 135 P12-16 |
| 125 P13 | 125 P13-14 | 125 P14 | 127.5 P14-15 | 130 P15 | 132.5 P15-16 | 135 P16 |

| 0 | 0 | 0 | 1 |
|---|---|---|---|
| 0 | 1 | 1 | 1 |
| 0 | 1 | 1 | 1 |
| 1 | 1 | 1 | 1 |

BLACK/WHITE THRESHOLD = 120

| 0 | 0 | 0 | 0 | 0 | 1 | 1 |
|---|---|---|---|---|---|---|
| 0 | 0 | 0 | 0 | 1 | 1 | 1 |
| 0 | 0 | 1 | 1 | 1 | 1 | 1 |
| 0 | 0 | 1 | 1 | 1 | 1 | 1 |
| 0 | 0 | 1 | 1 | 1 | 1 | 1 |
| 1 | 1 | 1 | 1 | 1 | 1 | 1 |
| 1 | 1 | 1 | 1 | 1 | 1 | 1 |

BLACK/WHITE THRESHOLD = 120

POSITION

UP

DOWN

LEFT

RIGHT

HEIGHT

TALLER

SHORTER

WIDTH

WIDER

NARROWER

BAR CODE READER CONFIGURED TO READ FINE PRINT BARCODE SYMBOLS

FIELD OF THE INVENTION

This invention relates generally to optical readers in general and, in particular, to an optical reader configured to read fine print bar code symbols.

BACKGROUND OF THE INVENTION

Bar code symbols are being employed in an ever-increasing number of applications, and the information requirements of such symbols are growing.

In recent years, there has been an increasing effort to encode large amounts of data into bar code symbols. New bar code symbol types, including 2d symbols such as stacked 1D and matrix symbols have become available which are specifically designed to increase the amount of data per area that can be encoded into a symbol.

In addition to utilizing new types of bar code symbols, users of bar code symbols have been printing such symbols in smaller sizes and in increasingly higher densities. The bar and space patterns of bar code symbols, whether 1D or 2D, are being printed and applied to items in increasingly finer prints.

The fine print of many bar code symbols in use today has resulted in an increase in the resolution requirements of optical reading devices which read such symbols. In the prior art, there has been suggested, in general, two approaches for addressing these increased resolution requirements.

The first approach suggested in the prior art for increasing reader resolution is to increase the pixel density of an image sensor used in an optical reader. This solution is highly effective performance-wise, but is also highly expensive. For purposes of illustrating the cost of increasing pixel density, a 1000 by 1000 pixel array sensor is currently approximately 8 times the cost of a 256 by 256 pixel array sensor. Incorporating a higher density pixel array into a reader also significantly increases data storage and data processing costs.

A second approach suggested by the prior art for increasing reader resolution is to adjust the reader optics so as to increase the magnification of captured scenes. This solution comes with the price of decreasing the area of the reader's field of view, however.

There is a need for a low cost high performance optical reader which is capable of reading fine print bar code symbols which are finding increased use.

SUMMARY OF THE INVENTION

According to its major aspects and broadly stated, the present invention is a method for decoding fine print bar code symbols. The method includes certain image data processing steps which facilitate the reading of finer print symbols without requiring that the resolution of the reader be enhanced by altering hardware aspects of the reader.

In the present invention, a bar code reader captures an initial image map corresponding to a scene, then subjects the initial image map to an interpolation step wherein values for constructed pixels (pixel positionally intermediate between pixels of the initial image map) are interpolated as initial bit map are interpolated as a function of the initial image map pixel values bordering the constructed pixels.

After an interpolated image map is constructed, the interpolated image map is subjected to a binarization step wherein grey scale pixel values of the interpolated image map are converted into binary (1 or 0) pixel values by way of a thresholding process. In the thresholding process, grey scale pixel values are compared to a threshold (which may vary across the image) in the grey scale range, then set to 1 if they are above the threshold and set to 0 if below the threshold.

The pixel values of the resulting binarized interpolated image map are then analyzed to determine the identity of a message which may be encoded in any symbol which may be represented in the binarized interpolated bit map.

Interpolating constructed pixel values before binarizing the interpolated bit map decreases the amount of image information that would otherwise be lost by binarizing an initially captured bit map image directly as in a prior art decoding method.

These and other details, advantages and benefits of the present invention will become apparent from the detailed description of the preferred embodiment hereinbelow.

BRIEF DESCRIPTION OF THE DRAWINGS

For a fuller understanding of the nature and objects of the invention, references should be made to the following detailed description of a preferred mode of practicing the invention, read in connection with the accompanying drawings, in which.

DETAILED DESCRIPTION OF THE PREFERRED EMBODIMENT

Figure 1:
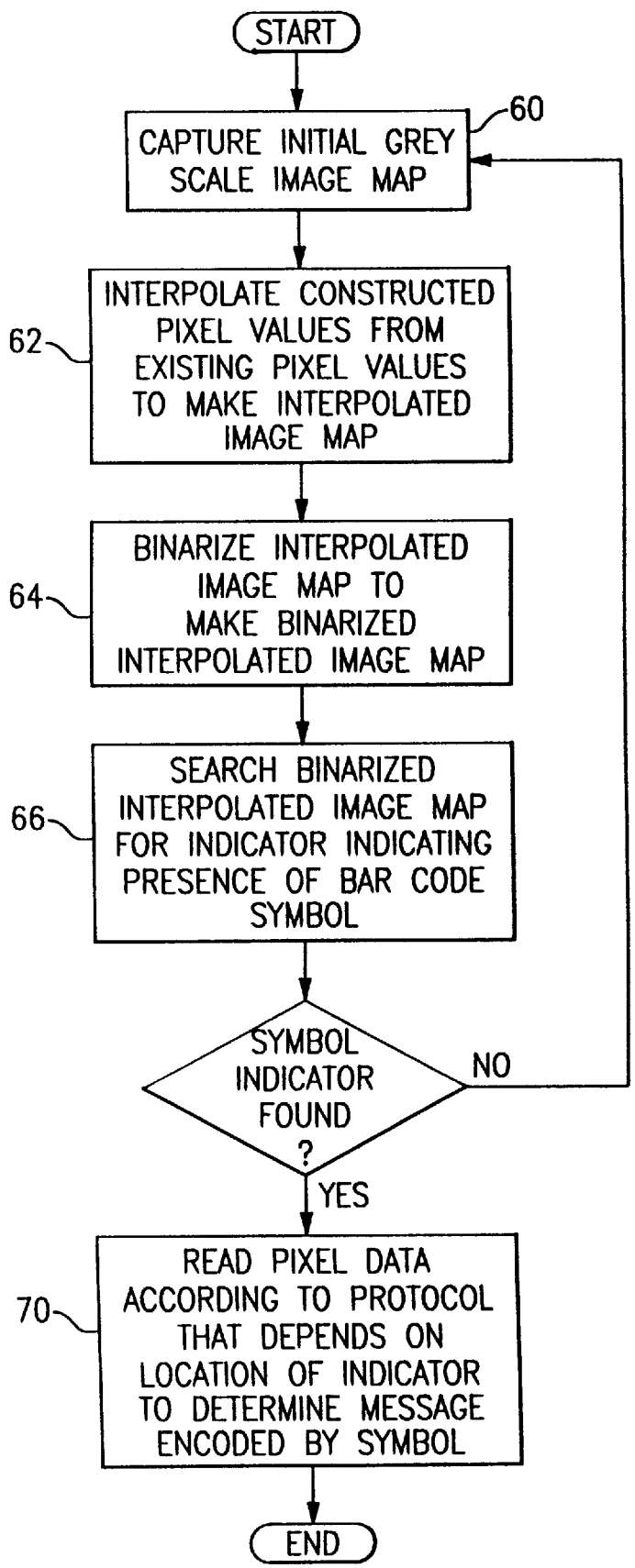
FIG. 1 is a flow diagram illustrating operation of a reader configured in accordance with the invention.
Figure 2:
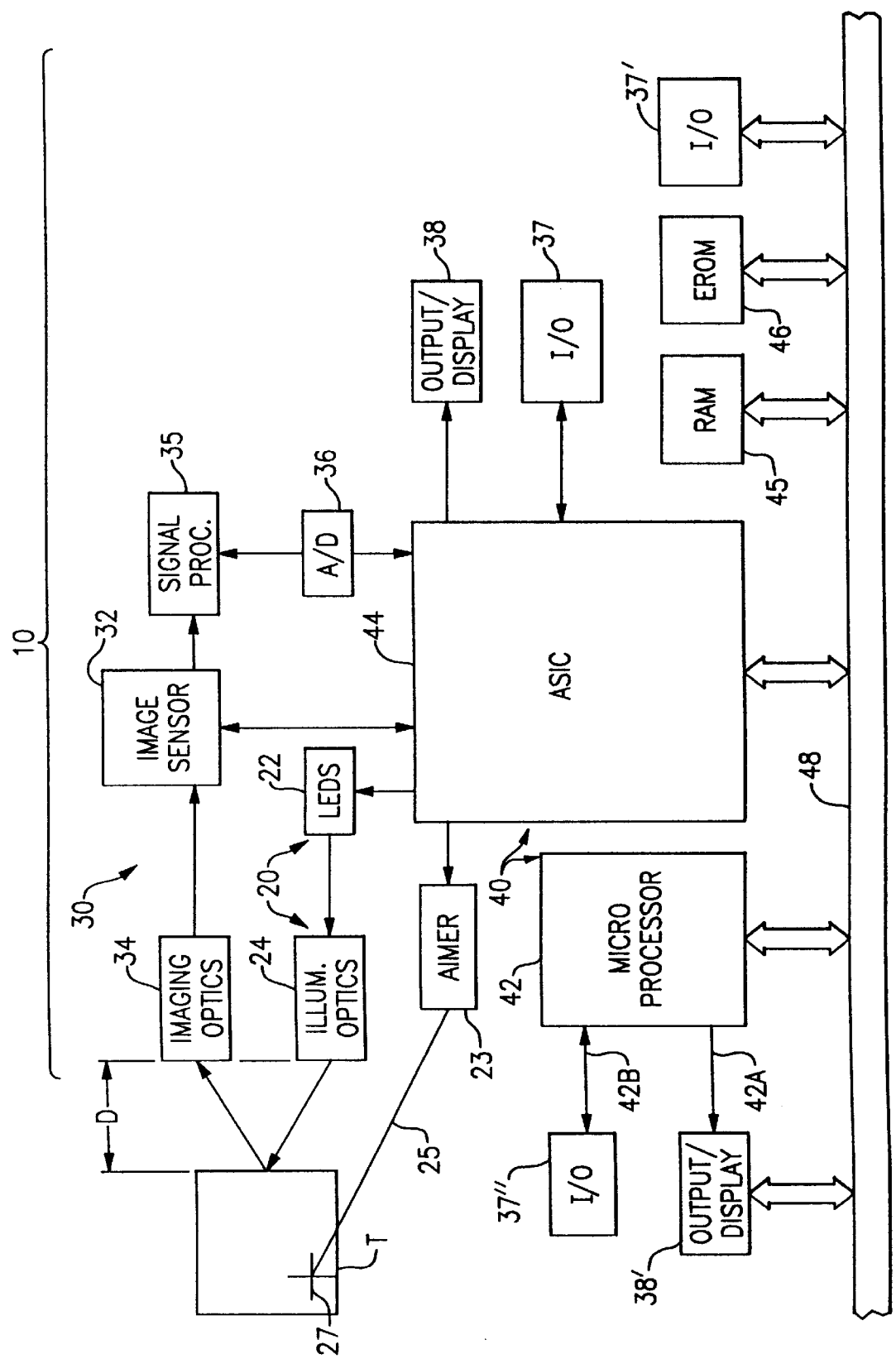
FIG. 2 is a block diagram of a bar code reader in which the invention may be incorporated.

A flow diagram illustrating operation of a reader configured in accordance with the invention is shown in FIG. 1 while a block diagram of an optical reader of the type in which the present invention may be incorporated is shown in FIG. 2. Optical reader 10 includes an illumination assembly 20 for illuminating a target object T, such as a 1D or 2D bar code symbol, and an imaging assembly 30 for receiving an image of object T and generating an image of object T and generating an electrical output signal indicative of the data optically encoded therein. Reader 10 may further include an aimer 23 which generates an aiming or spotter beam 25 to project a spotter patter 27 at or about a target object T. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated if ambient light levels are certain to be high enough to allow high quality images of object T to be taken. Imaging assembly 30 may include an image sensor 32, such as a 2 D CCD or CMOS solid state image sensor, together with an imaging optics assembly 34 for receiving and focusing an image of object T onto image sensor 32. The array-based imaging assembly shown in FIG. 2 may be replaced by a laser scanning based imaging assembly comprising a laser source, a scanning mechanism, emit and receive optics, a photodetector and accompanying signal processing circuitry.

Optical reader 10 of FIG. 2 also includes programmable controller 40 which preferably comprises an integrated circuit microprocessor 42 and an application specific integrated circuit or ASIC 44. Processor 42 and ASIC 44 are both programmable control devices which are able to receive, output and process date in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

Figure 8:
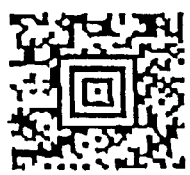
FIG. 8 shows an exemplary menu sheet which may be used to alter the position, shape, or size of a region of interest.
Figure 8:
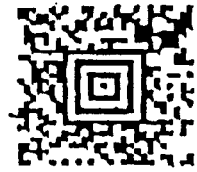
Figure 8:
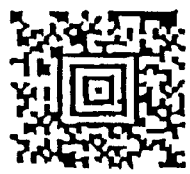
Figure 8:
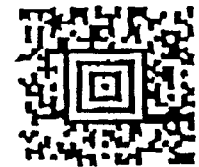
Figure 8:
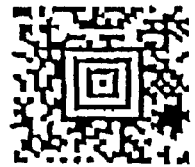
Figure 8:
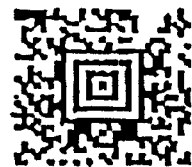
Figure 8:
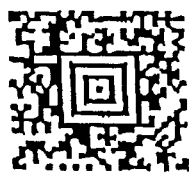
Figure 8:
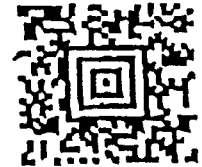

More particularly, processor 42 is preferably a general purpose, off-the-shelf VLSI integrated circuit microprocessor which has overall control of the circuitry of FIG. 8, but which devotes most of its time to decoding image data stored in RAM 45 in accordance with program data stored in EROM 46. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 2, a typical division of labor between processors 42 and 44 will be as follows. Processor 42 is preferably devoted primarily to the tasks of decoding image data, once such data has been stored in RAM 45, handling the menuing options and reprogramming functions, and providing overall system level coordination. Processor 44 is preferably devoted primarily to controlling the image acquisition process, and A/D conversion process and the storage of image data, including the ability to access memories 45 and 46 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a liquid crystal display. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37' and 38'. As explained earlier, the specifics of this division of labor is of no significance to the present invention.

Referring now to particular aspects of the invention, an exemplary embodiment of the invention is described with reference to the flow diagram of FIG. 1 and the pixel map diagrams shown in FIGS. 3–6.

Figures 3, 4:
FIG. 3 is a representation of an initial grey scale bit map.
FIG. 4 is a representation of an interpolated image map interpolated from the bit map shown in FIG. 2.

In accordance with the invention, reader 10 at block 60 captures an initial grey scale bit map that is represented by the pixel map of FIG. 3. The term "capture" as used herein shall refer generally to a process involving processing analog signals from imaging assembly 30, converting these signals into digital form, presenting them to controller 40 and generating therefrom an initial image map representation or other memory-stored representation of the captured image.

The grey scale image map includes one word of data per pixel, each word normally having between 4 and 8 bits. Preferably each word contains 8 bits, and represents a grey scale pixel value of between 0 and 255, 0 representing absolute black and 255 representing absolute white. The dimension of the initial grey scale bit map corresponds to the pixel dimension of pixel array. Common dimensions for a pixel array are 494 by 659 pixels or 574 by 768 pixels, for example. A simplified 4×4 pixel map is shown in FIG. 3 for purposes of describing the invention.

In a prior art decoding scheme, the initial image map represented in FIG. 3 is subjected to a binarization process immediately after being captured. The image map is binarized by way of a thresholding process wherein each pixel value is compared to an arbitrary threshold within the grey scale range. This threshold may be an arbitrary threshold within the grey scale range, but is preferably a variable threshold whose value varies depending on the value of pixels in proximity with the pixel currently being binarized. Each pixel value above the threshold is set to 1, while each pixel value below the threshold value is set to zero. A binarized representation of the image map of FIG. 3 binarized using a constant threshold of t=120 is shown in FIG. 5.

Figures 5, 6, 7:
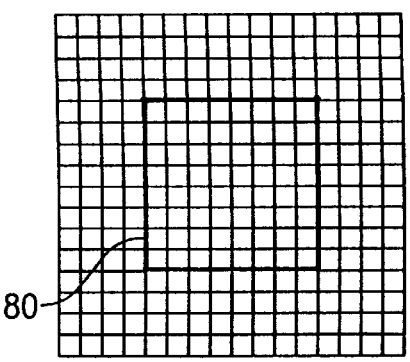
FIG. 5 is a representation of a binarized image map binarized from the initial bit map shown in FIG. 2.
FIG. 6 is a representation of a binarized image map binarized from the interpolated bit map shown in FIG. 3.
FIG. 7 is a representation of an initial image map including a region of interest which is selectively subjected to an interpolation step in accordance with the invention.

In the prior art decoding method, the next step in the decoding process is to analyze the binarized image map as represented by FIG. 5 to determine the information encoded by any bar code which may be contained in the pixel data. In a typical decoding algorithm, the analysis of the pixel data to determine the information encoded by any bar code includes the steps of (1) determining if an indicator (such as a bulls eye) is present indicating that a representative of a certain symbol contained a bar code certain symbology is contained in the image data, (2) reading captured pixel data according to a protocol that depends on a location of the indicator to determine the message encoded by a symbol. In the present invention, as illustrated by block 63 of the flow diagram of FIG. 1 controller 40 executes an intermediate interpolation step before binarizing grey scale pixel values. In an interpolation step, controller 40 interpolates pixel values for "constructed" pixels positionally intermediate of pixels in the initial image map.

An exemplary interpolated image map is shown in FIG. 4. The interpolated image map shown in FIG. 4 is developed from the initial image map shown in FIG. 3 by interpolating values for constructed pixels between the pixels of the initial image map. The value of each constructed pixel may be a function of the values of its bordering pixels. For example, $P_{1-2}$ may be a function of $p_1$ and $p_2$, and $p_{2-3}$ may be a function of $p_2$ and $p_3$ and so on. Center constructed pixel $P_{1-2-5-6}$ may be a function of pixels $P_1$, $P_2$, $P_5$ and $P_6$. In a typical embodiment, each constructed pixel is interpolated by averaging its neighboring pixels. It is seen that in the construction of the interpolated image map of FIG. 4 three constructed pixel values are interpolated for each one pixel of the original image map.

After constructing the interpolated image map at block 62, controller 40 at block 64 binarizes the interpolated image map. This binarization step may be carried out in the same manner that an initial image map is binarized as described previously in connection with FIGS. 2 and 4, that is, by a thresholding process wherein each pixel value in the image map is compared to a threshold and then set 1 if above the threshold and to 0 if below the threshold. Interpolating the initial grey scale image map to create an interpolated image map before binarizing the image map reduces the amount of image information lost by binarizing grey scale image data.

At blocks 66 and 70 controller 40 analyses the binarized interpolated image map generated at block 64 in order to determine the information represented in the binarized interpolated image map. As described previously in connection with FIG. 5, such analysis can include the steps of (1) determining if an indicator indicating the presence of a symbol of a certain symbology is present in the image data and (2) reading the pixel data according to a protocol that depends on the location of the indicator to determine the message encoded by a symbol.

Controller 40 can be programmed so that the controller interpolates an entire initial image map prior to binarizing the bits of an interpolated image map. In an alternative embodiment of the invention, the controller can be programmed to interpolate constructed pixel values for less than all pixel values of the image map. In one particular embodiment, controller 40 can be made to interpolate constructed pixel values only in predetermined areas of an image map.

A representation of an image map in which less than all pixels of an image map are interpolated is shown in FIG. 6. In this embodiment, constructed pixels are interpolated only from those pixels within a region of interest defined by boundary 80. Adapting the reader 10 to interpolate pixel values from less than all of the pixels in an initial image map reduces the time required to decode a symbol contained in a scene or to otherwise process the captured image information.

The invention can be adapted so that the region of interest defined by boundary 80 can be altered in response to user generated commands. In various alternative embodiments, the region of interest can be made larger or smaller, the shape of the region of interest can be changed, and the position of the region of interest can be moved in response to user generated commands.

The user generated commands which result in the region of interest being altered can be initiated by manual control inputs which may be provided on the reader itself or by control inputs of a peripheral device in communication with the reader. For example, the user generated commands may be initiated through use of a keyboard of a personal computer in communication with reader.

User generated commands resulting in altering of the size, shape and/or position of the region of interest can also be generated by reading of menu symbols, typically contained on a menu sheet as shown in FIG. 8. Menu symbols are symbols which when read and recognized by reader 10 result in the reader being reprogrammed in a certain way. Region of interest menu symbols as illustrated in FIG. 8 can be provided to result in the region of interest changing in position, shape, or size.

Changing the position, shape or size of a region of interest may be beneficial to the operation of the reader in a variety of operational situations. For example, it may be beneficial to change the position of boundary 80 as the reading depth of the reader changes. In some readers which include an aimer, such as aimer 23, an aimer projects an aiming pattern, such as pattern 27 centered at a point represented in pixels above a center pixel of a captured image when the reader is used to capture scenes at close range. When these readers are used to capture images at close range, it may be beneficial to adjust the position of boundary 80 upward in a pixel array so that the region of interest corresponds to an area of a scene highlighted by an aiming or spotter pattern.

In addition to making the size, shape, and/or position of a region of interest responsive to user generated commands, the size, shape and position of a region of interest can be made responsive to sensed features of a captured image.

For example, the size, shape, and position of a region of interest which is subjected to an interpolation step can be made responsive to features of a captured image which correspond to specific points of a bar code symbol. The decoding algorithm for decoding symbols of some symbologies begins with the step of locating a specific point of the symbol (typically a bulls eye) in captured image data. In one embodiment of the invention, the reader is configured so that the region of interest is a predetermined area of a pixel array about a pixel location corresponding to a bulls eye of a symbol.

Bar code readers typically search for and locate bulls eyes or other indicators of bar code symbols in binarized image data that has been binarized from an initial grey scale image map. Thus, readers that are configured to define a region of interest based on a location of a bullseye or another indicator of a symbol normally will be made to binarize an entire initial image map, determine the location of an indicator, define a region of interest based on the location of an indicator, and then interpolate constructed pixel values only within the region of interest.

A reader according to the invention can also be made to define a region of interest based on features of image data of an initial grey scale image map (without first binarizing an initial image and searching for and locating features of image data in a binarized image map). For example, a reader according to the invention can be made to define a region of interest within an initial image map by measuring "energy" (the strength and number of transitions in an area of the image map) or another feature of the initial image map image data. Readers configured as such will decode bar code symbol, in general, by capturing an initial grey scale image map, detecting a feature of the initial image map, defining a region of interest within the initial image map based on the detected feature, interpolating constructed pixel values within the region of interest to form an interpolated image map, binarizing pixel values from the interpolated image map, and analyzing the binarized interpolated image map to determine a message encoded by a symbol.

In another embodiment of the invention, the reader can be configured so that the region of interest defined by boundary 80 expands if certain features of pixel data in a captured pixel array are sensed. In the example of FIG. 6, an initial region of interest is defined by boundary 80. If during the image data analysis process, it is determined that an entire symbol is contained within boundary 80, then the region of interest is not expanded. In an embodiment of the invention including the expandable region of interest feature, however, then the reader expands the region of interest if while analyzing image data, the reader determines that an entire symbol is not contained within a region of interest.

While the present invention has been explained with reference to the structure disclosed herein, it is not confined to the details set forth and this invention is intended to cover any modifications and changes as may come within the scope of the following claims:

What is claimed is:

1. A method for processing image data with use of an optical reader, said method comprising the steps of:

capturing a first gray scale image map corresponding to a scene including a symbol;

defining a region of interest within said image map comprising a subset of pixels of said first image map;

interpolating constructed pixel values only from those pixel values corresponding to pixel locations within said region of interest to form an interpolated image map within said region of interest; and binarizing said interpolated image map to form a binarized interpolated image map so that a region of said scene corresponding to said region of interest is represented by a binarized image map comprising a greater number of pixel values per unit scene area than is represented by said first grey scale image map.

2. The method of claim 1, wherein said method further comprises the step of defining a region of interest, and wherein said interpolating step includes the step of interpolating constructed pixel values only from those pixel values within said region of interest.

3. The method of claim 2, further comprising the step of adjusting at least one of a size, a shape, or a position of said region of interest.

4. The method of claim 2, further comprising the step of reading a region of interest menu symbol to adjust at least one of a size, a shape, or a position of said region of interest.

5. The method of claim 1, wherein said interpolating step includes the step of interpolating values for said constructed pixel values by averaging pixel values from said initial image map which border positions of said constructed pixel values.

6. The method of claim 1, wherein said defining step includes the step of locating a symbology indicator, and defining said region of interest about said dicator.

7. The method of claim 1, wherein said binarization step includes the step of comparing pixel values in said binarized interpolated image map to a threshold within a grey scale range.

8. The method of claim 1, wherein said method further comprises the step of adjusting said region of interest in response to sensed features of said first grey scale image map.

9. The method of claim 8, wherein said method further includes the step, after said determining step of ascertaining whether an entire symbol is contained within said region of interest, and expanding said region of interest if an entire symbol is not contained within said region of interest.

10. The method of claim 1, wherein said defining step comprises the steps of sensing a feature of said first grey scale image map, and establishing said region of interest based on said sensed feature of said first grey scale image map.

11. The method of claim 10, wherein said sensing step includes the step of sensing transitions of said first grey scale image map.

12. A method for processing image data with use of an optical reader, said method of comprising the steps of:

capturing an first grey scale image map corresponding to a scene including a symbol;

binarizing said grey scale image map to form a binarized image map;

analyzing said binarized image map to determine a location of a symbology indicator;

establishing a region of interest about said located symbology indicator;

interpolating constructed pixel values from existing pixel values in said first grey scale image map within said region of interest to form an interpolated image map; and binarizing said interpolated image map to form a binarized interpolated image map within said region of interest.

13. The method of claim 12, wherein said analyzing step includes the step of searching for a bullseye of a symbol.

14. The method claim 12, wherein said interpolating step includes the step of interpolating values for said constructed pixel values by averaging pixel values from said first image map which border constructed pixel positions of said constructed pixel values.

15. A method for processing image data using an optical reader, said method comprising the steps of:

capturing a first grey scale image map;

identifying pixel positions of said first grey scale image map that correspond to a symbol representation;

selectively interpolating constructed pixel values only from pixel values of said identified pixel positions of said image map that correspond to said symbol representation, said identified pixel positions comprising less than all pixels of said first grey scale image map; and binarizing said constructed pixel values.

16. The method of claim 15, wherein said identifying step includes the steps of binarizing pixel values of said first grey scale image map to form a binarized image map, and finding a symbology indicator representation utilizing said binarized image map.

17. The method of claim 15, wherein said identifying step includes the step of finding a symbology indicator representation.

18. The method of claim 15, wherein said identifying step includes the step of finding a symbology indicator representation, and defining a region of interest about said symbology indicator representation.

19. The method of claim 15, further comprising the step of analyzing said binarized constructed pixel values to determine a message encoded in said symbol representation.

* * * * *

UNITED STATES PATENT AND TRADEMARK OFFICE
CERTIFICATE OF CORRECTION

PATENT NO. : 6,264,105 B1
DATED : July 24, 2001
INVENTOR(S) : Longacre, Jr. et al.

It is certified that error appears in the above-identified patent and that said Letters Patent is hereby corrected as shown below:

<u>Column 7,</u>
Claim 2 should be replaced as:

-- 2. The method of claim 1, wherein said region of interest is established to correspond to an aiming pattern of said reader. --

Signed and Sealed this

Twenty-third Day of April, 2002

Attest:

JAMES E. ROGAN
*Director of the United States Patent and Trademark Office*

*Attesting Officer*